April 21, 1953  E. F. HEIMBUCH  2,635,907
SEAL FOR SHAFTS
Filed Nov. 13, 1950
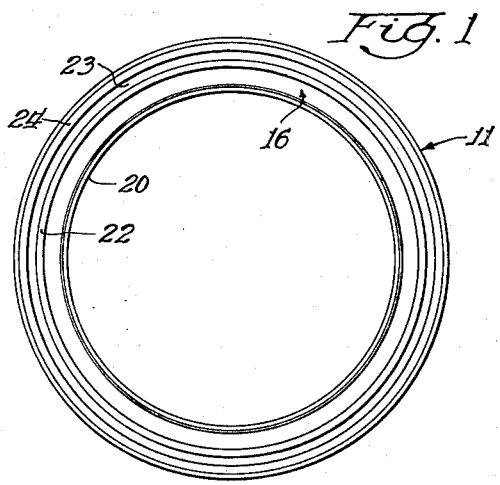
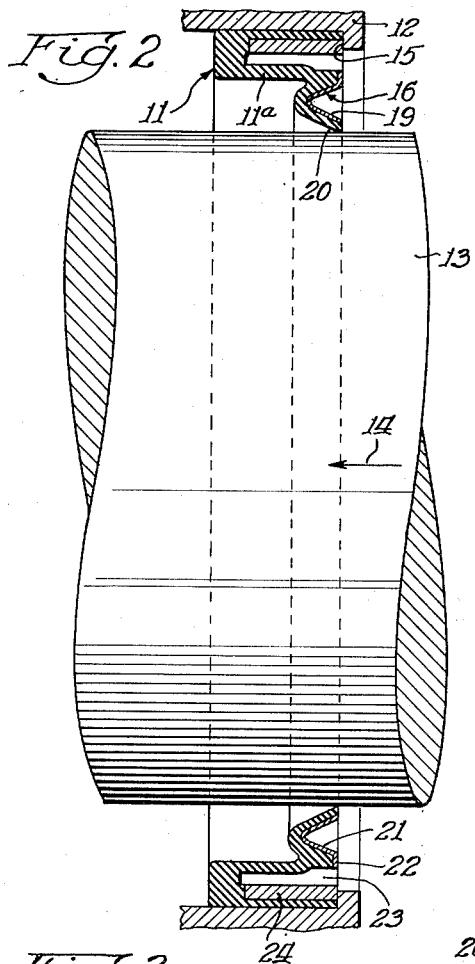
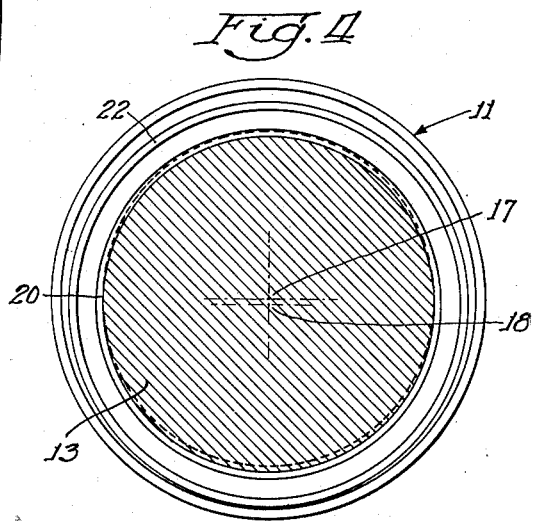
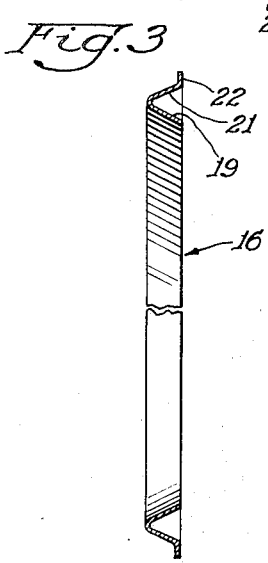
Inventor:
Elmer F. Heimbuch
By: Jones, Tesch & Darbo
Attys.

Patented Apr. 21, 1953

2,635,907

UNITED STATES PATENT OFFICE 2,635,907

SEAL FOR SHAFTS

Elmer F. Heimbuch, Chicago Heights, Ill., assignor to Brummer Manufacturing Corporation, Chicago Heights, Ill., a corporation of Illinois Application November 13, 1950, Serial No. 195,313

4 Claims. (Cl. 288—2)

This invention relates to a seal for the purpose of sealing the space between a shaft and its housing against the egress of oil or grease.

The invention has marked utility in providing an improved oil or grease seal or retainer, for example, for engine transmissions and automotive vehicle rear axles, and also advantageously for other oil or grease retainer purposes such as in railroad car journal boxes.

In an important aspect, the present invention aims to provide a new and improved seal of this class comprising a rigid sealing ring adapted to make a running fit with a rotating shaft or axle and resiliently mounted whereby the ring will follow the shaft in lateral variations thereof without distortion and while maintaining a true circle about the shaft in different shifted or eccentric positions of the latter.

These and other objects and advantages will be apparent from the following description, taken together with the accompanying drawings, of an illustrative embodiment of the invention, and in which drawings—

Figure 1 is a face view of a seal following the present invention;

Figure 2 is an enlarged diametrical sectional view of the seal shown in Fig. 1 installed in a shaft housing and on a shaft;

Figure 3 is a separated diametrical sectional view of the rigid ring following the present invention, on the scale of Fig. 2; and Figure 4 is a view on the scale of Fig. 1 showing a cross-section through a shaft shifted eccentrically or laterally, this figure being somewhat diagrammatic.

Heretofore, where shaft seal devices have included garter springs or other inherently resilient elements to grip the shaft, they have in addition to causing wear on the shaft taken an oval or elliptical form under the action of lateral movements of the shaft, which oval or elliptical forms provide a less efficient seal about the shaft than the true circle maintained by the rigid ring of the present invention.

It has more recently been found that it is not necessary or even perhaps desirable for a seal to grip the shaft so that a film of oil or grease may in fact advantageously interposed between the shaft and the seal lip, thus eliminating wear on the shaft while still providing an effective seal. I have gone a step further and found that since the sealing lip does not need to grip the shaft, the sealing lip may be a floating rigid annulus with attendant advantages that it will follow eccentric or lateral movements of the shaft while always maintaining a true circle thereabout.

Referring in detail to the illustrative construction shown in the drawings, the numeral 11 may be an annular body of resilient material, such as a suitable elastomer of a rubber or rubber-like substance, adapted to be received by a press fit within a housing 12 for a rotating shaft 13, and as to which it is desired to seal the space between the shaft and the housing against egress of oil or grease in the direction indicated by the arrow 14 along the shaft. The housing 12 may have a shoulder 15 against which the body 11 is pressed.

Carried radially interiorly of the body 11, following the present invention, is a rigid ring 16 of metal or other rigid material approaching the strength and stiffness of steel. Between the ring 16 and the outer periphery of the body 11 the body 11 has a portion of enhanced resilience or diaphragm-like character as at 11a. Since the ring 16 is rigid and continuous the seal is placed on the shaft and within the housing by being slipped over the end of the shaft and fitted so as to make a close running fit on the shaft but without a cutting or wear-causing contact.

Further following the present invention, the ring 16 desirably has a cross-section which is V-shape in an axial direction, one leg 19 of the V forming an inwardly obliquely directed annular sealing lip for encircling the shaft 13, through the intermediation, say, of a facing of anti-friction material 20 which in this instance may be a part of the rubber-like body 11 molded about the metal ring 16. The facing 20 is desirably of thin cross-section. Since the ring 16 is rigid it will be understood that it will not materially expand or contract on the shaft and therefore will not cut or wear the shaft.

The other leg 21 of the ring 16 is shown having the radially outwardly extending flange 22 terminating radially short of the outer periphery of the body 11.

To enhance the floating mounting of the ring 16 within the body and the diaphragm-like effect of the part 11a, the body is shown partially axially slotted as at 23 and the flange 22 of the ring 16 is shown terminating at this slot 23, thus providing an elastic part of the body for eccentric movements of the ring 16 within the body 11 and, for all normal movements thereof under the influence of the shaft 13, without contact of the ring 16 with parts of the body 11 radially outward of the slot 23.

To enhance the stability of the body 11 in the housing 12, the body 11 outwardly of the slot 23 may carry reinforcement means such as an annular metal band 24 which faces one side of the slot 23 opposite and outwardly of the ring 16; the slot 23 is between the band and the ring.

The rigidity of the ring 16 is desirably enhanced by its corrugated or V-shape construction and by the flange part 22 thereof.

So constructed and arranged, the ring 16 may float, as it were, between the shaft and the outer periphery of the resilient body 11 and thus allow eccentric or lateral movements of the shaft 13 without distortion of the ring and within the limits of the body outer periphery. For example, as shown in Fig. 4, the normal axis of the shaft 13 may be at 17, concentric with the axis of the seal body 11. In running conditions, the shaft may shift laterally so that its axis may move say to 18. When the axis of the shaft is at 17, the axis of the ring 16 will also be at 17. When the axis of the shaft shifts to 18, the axis of the ring 16 will also shift to 18, the elastic part 11a of the body 11 yielding for this purpose. Thus the rigid ring 16 will always maintain a true circle about the shaft 13, enhancing its sealing function regardless of shifted or eccentric positions on the shaft with respect to the housing 12.

It will be understood by those skilled in the art that the parts might be reversed, i. e., the body might be on the inside to make a tight fit with one relatively rotatable element and the rigid ring on the outside to make a close running fit with another relatively rotatable element.

The invention is not intended to be limited to details of construction shown for purposes of exemplification and such changes may be made as fall within the scope of the appended claims without departing from the invention.

The invention having been described what is here claimed is:

1. Seal means for use with a rotating shaft and housing therefor, comprising an annular body of elastomeric material for making a close fit with the housing, and having an annular axial slot partly therethrough providing an inner diaphragm portion of the body, an axially V-shape circular body portion integral with the diaphragm portion at the outer end of said slot and extending radially inwardly therefrom, the inner edge of said V-shape portion providing a sealing lip for contact with the shaft, and a substantially rigid axially V-shape ring conforming to and within the V-shape body portion to reinforce said lip, whereby the lip may shift with the shaft, independently of the housing engaging portion of the body, but is maintained circular by said V-shape ring.

2. The structure of claim 1 wherein there is a rigid annular metal band in said slot for compressing the body between the housing and said band, said band being spaced from the diaphragm portion.

3. The structure of claim 1 wherein the sealing lip is faced with a fabric anti-friction impregnated material.

4. The structure of claim 1 wherein the outer leg of the V-shape ring is continued outwardly in an annular radial flange terminating at said slot to enhance the rigidity of the ring.

ELMER F. HEIMBUCH.

References Cited in the file of this patent

UNITED STATES PATENTS

| Number | Name | Date |
|---|---|---|
| 2,088,703 | Hubbard et al. | Aug. 3, 1937 |
| 2,093,572 | Padgett | Sept. 21, 1937 |
| 2,208,482 | Victor | July 16, 1940 |
| 2,213,116 | Bernstein | Aug. 27, 1940 |
| 2,358,536 | Reynolds | Sept. 19, 1944 |
| 2,482,029 | Reynolds | Sept. 13, 1949 |
| 2,509,151 | Kasten | May 23, 1950 |